United States Patent [19]

Workman

[11] 4,137,472
[45] Jan. 30, 1979

[54] COOLING SYSTEM FOR ELECTRIC MOTORS

[75] Inventor: John Workman, Greyabbey, Northern Ireland

[73] Assignee: S.B.W. Engineers Limited, Belfast, Northern Ireland

[21] Appl. No.: 724,069

[22] Filed: Sep. 16, 1976

Related U.S. Application Data

[63] Continuation of Ser. No. 544,652, Jan. 27, 1975, abandoned.

[30] Foreign Application Priority Data

Jan. 31, 1974 [GB] United Kingdom ............... 04435/74

[51] Int. Cl.² .............................................. H02K 1/32
[52] U.S. Cl. ........................................ 310/61; 165/11; 165/105
[58] Field of Search ........................ 310/52, 54, 64, 57, 310/58, 59, 60, 61, 62, 63, 68 C; 165/105, 86, 11

[56] References Cited

U.S. PATENT DOCUMENTS

| | | | |
|---|---|---|---|
| 3,746,081 | 7/1973 | Corman | 165/105 |
| 3,765,480 | 10/1973 | Fries | 165/86 |
| 3,786,861 | 1/1974 | Eggers | 165/105 |
| 3,816,780 | 6/1974 | Smith | 310/52 |
| 3,828,849 | 8/1974 | Corman | 165/105 |
| 3,842,596 | 10/1974 | Gray | 165/86 |
| 3,882,335 | 5/1975 | Fries | 310/61 |
| 3,914,630 | 10/1975 | Lloyd | 310/61 |

*Primary Examiner*—R. Skudy
*Attorney, Agent, or Firm*—Mason, Fenwick & Lawrence

[57] ABSTRACT

The present invention comprises a rotor for an electric motor which rotor is provided with cooling arrangement in the form of a heat pipe extending axially within the rotor. The heat pipe has an evaporating portion within the body of the rotor and a condensing portion extending out with the body of the rotor. Attached to the condensing portion is a shaft extension which is adapted to define a trap for incondensible gases which contaminate the working fluid when in the gaseous state, the trap has a lesser radial dimension than the condensing portion and a pocket is formed in the shaft extension, extending co-axially with the axis of the shaft, and accessible from the exterior of the assembly so as to accommodate a thermal probe to detect the amount of incondensible gas within the trap. When this amount exceeds a predetermined level the rotor is withdrawn from service and the gas removed by an evacuation process.

17 Claims, 6 Drawing Figures

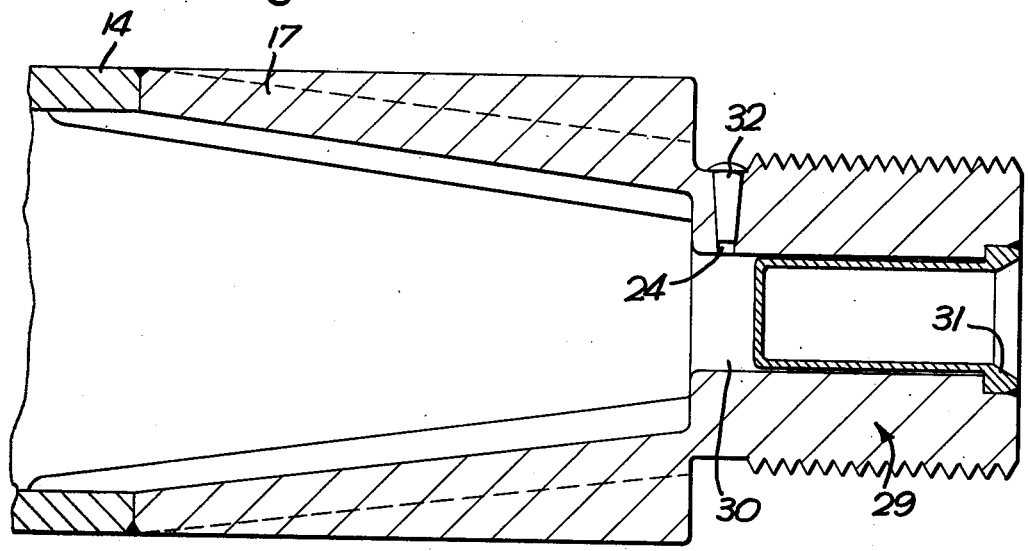
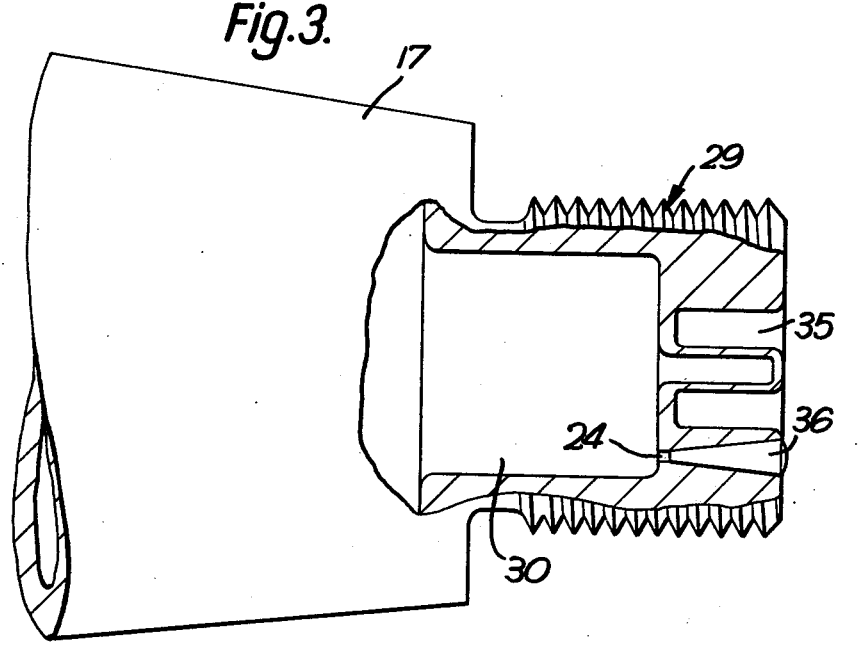

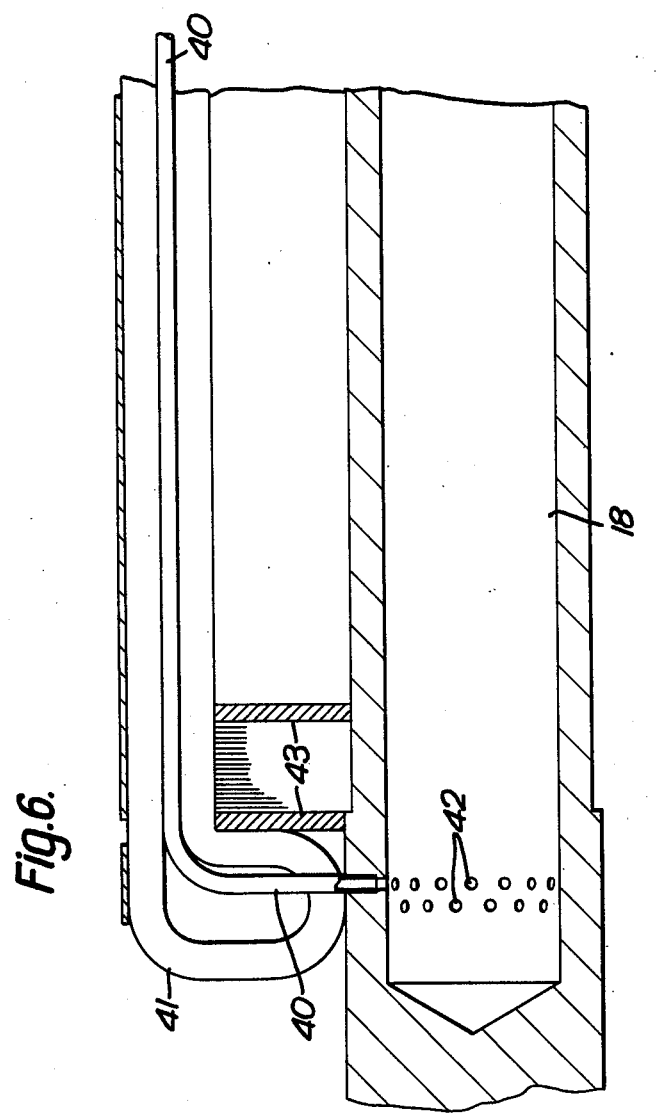

COOLING SYSTEM FOR ELECTRIC MOTORS

This is a continuation, of application Ser. No. 544,652, filed Jan. 27, 1975 now abandoned.

This invention relates to electric motors.

A problem with electric motors and especially D.C electric motors is the heat generated in the rotor due to the currents flowing in the windings. One solution to this problem is to cool the rotor by blowing air through the rotor. This solution has the disadvantage of requiring some form of fan either integral with the rotor or driven separately from the motor and passageways must be provided in the rotor to allow the cooling air to pass over the surfaces of the conductors, all of which tend to increase the overall dimensions of the motor.

An object of the present invention is to obviate or mitigate the above disadvantage.

According to the present invention there is provided a rotor for an electric motor, having a heat pipe extending axially therein, the heat pipe having an evaporating portion within the rotor and a condensing portion extending outwith the rotor.

Further, according to the present invention there is provided an electric motor having a rotor as aforesaid.

Embodiments of the present invention will now be described by way of example with reference to the accompanying drawings in which:

FIG. 2 is an enlarged sectional view of a modified condensing portion of the heat pipe in FIG. 1;

FIG. 3 is an enlarged sectional view of a further modified condensing portion of the heat pipe in FIG. 1;

FIG. 6 is a sectional elevation of part of the rotor showing a further modification of the invention.

Figure 1:
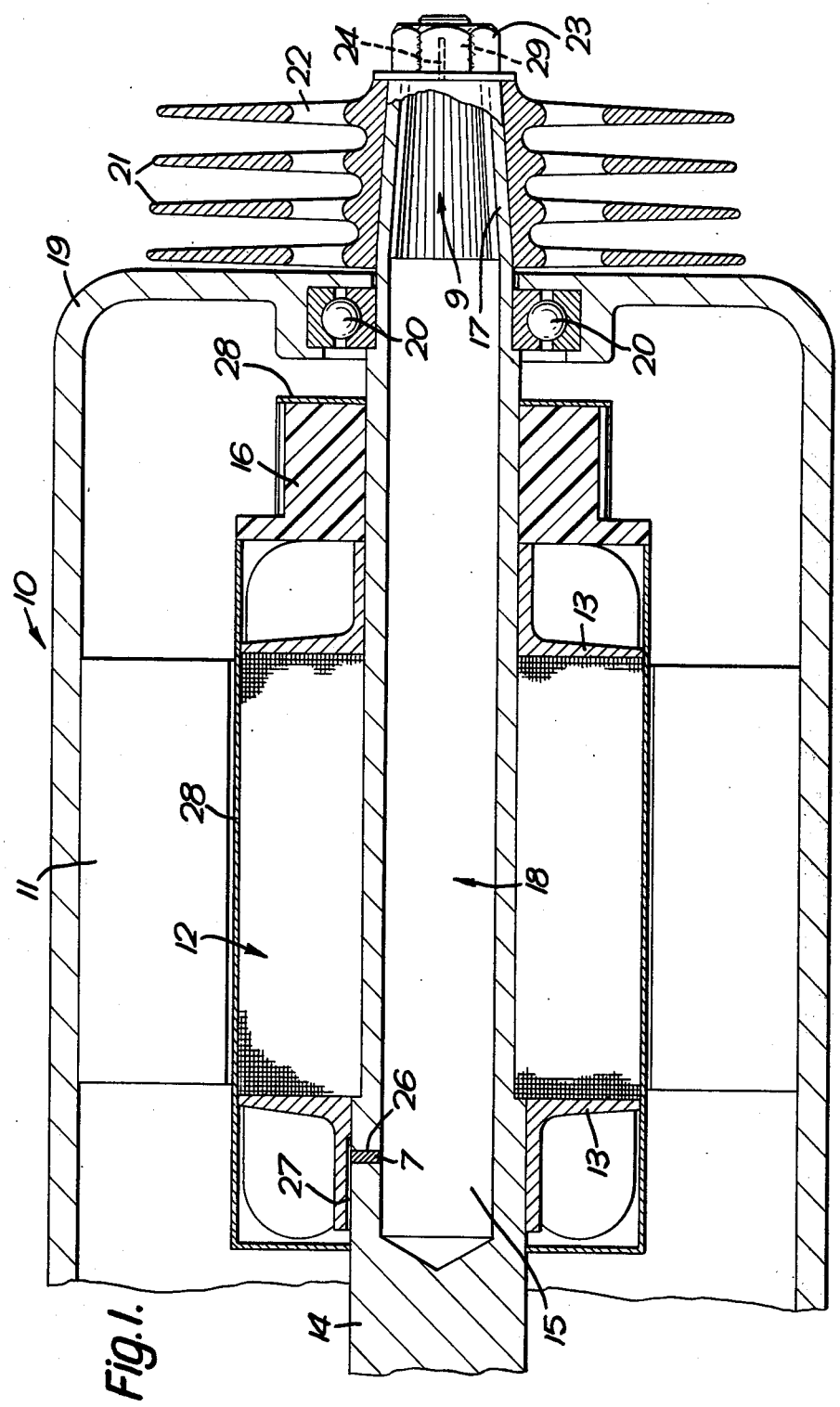
FIG. 1 is a sectional elevation of part of a two-pole D.C. electric motor having a rotor which includes a heat pipe with an evaporating and condensing portion, according to the present invention.

In FIG. 1, a two-pole D.C. electric motor 10 has a stator 11 and a rotor 12 having a shaft 14 rotatably mounted in a motor housing 19 on bearings 20. The rotor has a plurality of windings (not shown) formed between two winding flanges 13 which windings are supplied with power from brushes (not shown) which bear against a commutator 16 mounted on the shaft 14. The shaft 14 is constructed in the form of a heat pipe by having a hollow section 15 bored to a suitable diameter extending from the non-driving end of the rotor into the region of the shaft covered by the windings and commutator 16. This hollow section forms the evaporating portion 18 of the heat pipe. A condensing portion 9 of the heat pipe is formed from a tapered shaft 17 which has a hollow internally tapered section which is permanently fixed on to the shaft 14 of the rotor 12. The condensing portion 9 has a heat sink in the form of fins 21 made from aluminium or magnesium mounted on the shaft 17 and is held in position by splines or a key (not shown) and a nut 23 which engages a threaded stub 29 of the shaft 12.

A working fluid, for example water, is introduced into the hollow portion 15 of the shaft 14, the air within the hollow portion 15 is withdrawn through a channel 24 in the stub 29, and the channel is subsequently sealed to thereby form the heat tube.

To increase the rate of condensation in the condensing portion of the heat tube, the tapered internal surface of the condensing portion is axially ribbed which increases the surface area. Also the cooling fins 21 are provided with apertures 22 to allow the circulation of air.

To increase the overall performance of the heat tube it is preferable to coat the entire internal surface of the heat tube with a material which is compatible with the working fluid, such as copper in this case. It is also preferable to use high conductivity and, if necessary, low strength materials in regions of high radial thermal flux density, for example, the hub of the condenser. Thus, as is illustrated in FIG. 1, the axial length of the evaporating portion may approximate to four times that of the condensing portion.

A safety device is provided in the evaporating portion of the tube in the form of an aperture 26 which communicates with a passageway 27 in the winding flange 13 which is open to atmosphere. The aperture 26 is sealed with a fusible plug 7, which, in the event of excessive temperatures arising in the rotor, for example under burn-out conditions, will melt and release safely any pressure build-up in the heat tube.

To help direct any heat generated in the rotor into the heat pipe, the external surface of the rotor 12 and commutator 16 are covered with a heat shield 28 which will also prevent any heat generated in the rotor from escaping into the stator.

In operation, heat generated in the windings causes the water in the heat tube to evaporate thereby absorbing heat from the windings. The vapour then travels axially along the tube to the condensing portion 9 at which point the vapour condenses giving up its latent heat which is absorbed by the cooling fins 21. Due to the centrifugal forces generated as the shaft rotates and the tapered internal surface of the condensing portion of the heat tube, the condensate forms on the walls of the tube and is forced back along the walls of the tube to the evaporating portion 18 of the tube. Thus the heat within the windings is transferred axially along the heat tube to the cooling fins 21.

In the heat tubes, in general, the efficiency of the tube decreases through time due to the accumulation of non-condensible gases. In FIG. 2, a modification of the heat pipe is shown which helps overcome this problem. The condensing portion of the heat tube is provided with a gas trap or first pocket 30 in the form of an axial bore which is sealed by an annular copper end cap 31 which on its interior defines a second pocket which is open at its outer end as shown in FIG. 2 and the walls of which are relatively thin compared with the walls of the heat tube. Any non-condensible gas within the heat tube will accumulate in the gas trap 30 and will surround the walls of the annular end cap 31. The nature of the condenser is such that a sharp boundary region is formed between the vapour and the gas. Thus a temperature probe inserted into the space in the annular gap with the rotor in situ can be used to indicate the position of the gas/vapour boundary which gives an indication of the quantity of accumulated non-condensible gas.

When a quantity of gas is measured which would be sufficient to substantially reduce the efficiency of the heat pipe, the rotor can be withdrawn from service and the heat pipe can be re-evacuated to remove the gas. Therefore this embodiment provides a simple test procedure for rotors in situ. In heat tubes having a gas trap of the type described, the channel 24 is radially disposed on the shaft 14, and sealed with a plug 32.

In FIG. 3, an alternative arrangement of gas traps is shown in which an annular recess or second pocket 35 is formed in the stub 29 of the shaft 14, the central portion of the stub being hollow and comprising a portion of the first pocket 30 to accumulate non-condensible gases. Again a temperature probe inserted into the annular recess would be able to detect the position of the vapour/gas boundary and therefore the amount of non-condensible gases accumulated in the gas trap. In this arrangement, the channel 24 is axially disposed in the stub 29 and is sealed with a plug 36.

Figure 4:
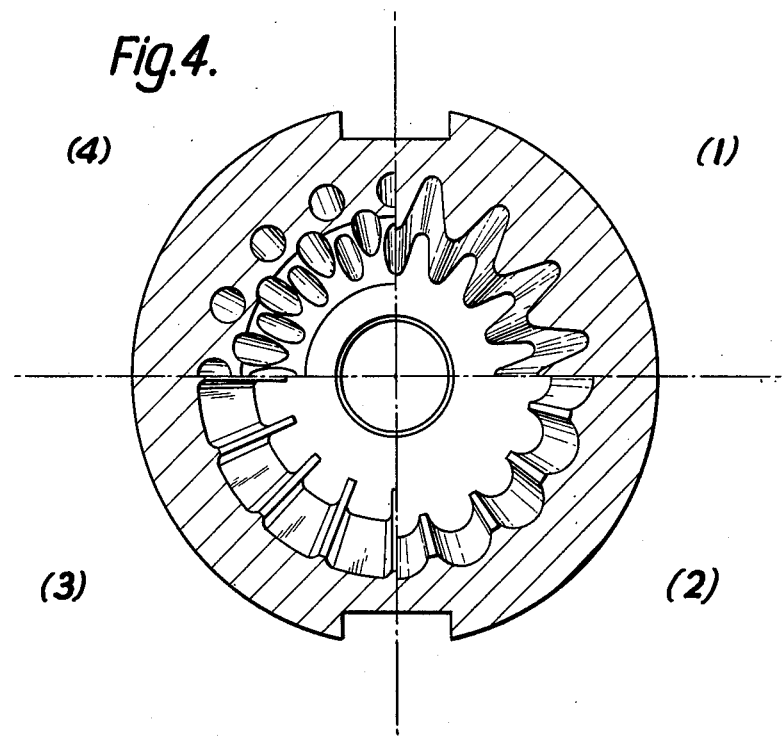
FIG. 4 is a cross-sectional view of the condensing portion of the heat pipe in FIG. 1, showing alternative modifications of the internal surfaces.

In FIG. 4, sector 1 shows a fluted condensing surface; sector 2 shows a condensing surface having a plurality of partially drilled holes which form a series of ridges; sector 3 shows a condensing surface with a plurality of fins mounted thereon; and sector 4 shows a condensing surface having multiple rows of holes drilled axially therein.

Figure 5:
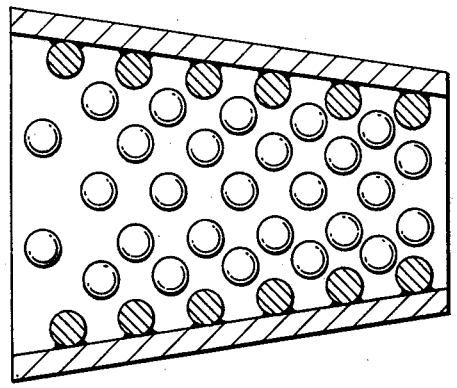
FIG. 5 is a sectional elevation of the condensing portion of the heat pipe in FIG. 1 showing a further alternative modification of the internal surface.

In FIG. 5, small metal spheres, preferably of copper, are brazed to the internal surface of the condenser in a configuration which provides sufficient gaps for the return circulation of condensate and would leave exposed fresh surfaces for condensation due to the rapid removal of condensate from the surfaces of the sphere by the centrifugal forces.

All of the surfaces shown in FIGS. 4 and 5 provide a condensing surface which will stand clear of the annular complement of working fluid which may be present in the condensing portion of the heat pipe.

In FIG. 6, the cooling effect of the heat pipe shown in FIG. 1 may be increased further by incorporating a plurality of subsidiary pipes 40 between each winding 41, each subsidiary pipe being suitably isolated electrically from the windings 41 and having one end connected to the evaporating portion 18 of the heat pipe through a plurality of radially disposed apertures 42. Thus the working fluid is in communication with the subsidiary pipes and will remove heat from the adjacent windings by evaporation. Also copper discs 43 may be built into the hub to assist conduction of heat from the windings 41 towards the heat pipe.

Although in the embodiments described herein, the internal surface of the condensing portion is tapered, this is not essential to the working of the invention. If the internal surface of the condensing portion was simply cylindrical, the accumulation of condensate on the surface would tend to move back along the tube of the evaporating region.

In a further modification of the invention, the internal surface of the condensing portion of the heat pipe is coated with noble metals, preferably silver with a final gold top surface. This arrangement increases the performance of the condensing portion in a drop-wise mode which is particularly beneficial at the low end of the speed range of the motor where high centrifugal forces are not present to purge the condensing portion of condensate.

In a still further modification, the heat sink in the form of fins 21 may be replaced by a pulley which would be capable of providing a drive output as well as performing a cooling function.

The aforedescribed invention is particularly suitable for 2-pole and 4-pole D.C. motors, and wound rotors and squirrel cage rotors for induction motors.

I claim:

1. An electromagnetic machine rotor assembly comprising a rotor shaft internally accommodating a heat pipe which extends axially therealong and has an evaporating portion and a condensing portion, a rotor mounted on the rotor shaft so that the heat pipe evaporating portion lies within the axial confines of the rotor and the condensing portion lies outwardly of the axial extent of the rotor, a first pocket formed in the end portion of the shaft which is adjacent said heat pipe condensing portion, said first pocket being concentric with the shaft axis and opening into said condensing portion, and being of lesser radial dimension than said condensing portion, whereby said first pocket acts as a trap for non-condensible gases within the heat pipe, a second pocket formed in said shaft end portion and open at one end face thereof, said second pocket being coaxial with said shaft axis, one of said first and second pockets being annular and surrounding the other of said first and second pockets.

2. An assembly as claimed in claim 1, wherein the rotor shaft is formed from a first metal of high structural strength within which the evaporating portion of the heat pipe is defined and from a second metal having high thermal conductivity within which the condensing portion of the heat pipe is defined.

3. An assembly as claimed in claim 1, including windings mounted on the rotor and subsidiary pipes embedded in said windings on the rotor, each subsidiary pipe having one end connected in fluid communication with the evaporating portion.

4. An assembly as claimed in claim 1, wherein said shaft end portion includes an axial bore, a hollow end cap being mounted in the end of said bore remote from the condensing portion to form an annular space between said axial bore and the end cap and defining said first pocket.

5. An assembly as claimed in claim 1, wherein said first pocket is formed by an axial bore in said shaft end portion and said second pocket is defined by an annular recess which surrounds a portion of said axial bore.

6. An assembly as claimed in claim 1, wherein said shaft includes means defining an aperture connecting the evaporating portion of the pipe to the atmosphere, the aperture being sealed by a plug made of a material which fuses in the event of excessive temperatures arising in the rotor.

7. An assembly as claimed in claim 1, wherein the internal surface of said condensing portion is tapered, being of smaller radial dimension adjacent the first pocket than adjacent the evaporating portion and said internal surface incorporates upstanding formations of sufficient radial dimension to stand clear of the annular component of fluid work present in the condensing portion of the heat pipe.

8. An assembly as claimed in claim 7, wherein the condensing portion internal surface is fluted.

9. An assembly as claimed in claim 7, wherein the condensing portion internal surface is ridged.

10. An assembly as claimed in claim 7, wherein the condensing portion internal surface carries a plurality of fins.

11. An assembly as claimed in claim 1, wherein the condensing portion internal surface carries a plurality of metal spheres.

12. An assembly as claimed in claim 1, including windings mounted on the rotor and a plurality of thermally conductive discs axially spaced along the rotor for conducting heat generated in the windings to the evaporating portion of the heat pipe.

13. An assembly as claimed in claim 1, including cooling fins mounted on the rotor shaft at the condensing portion of the heat pipe.

14. An assembly as claimed in claim 1, wherein the axial length of the evaporating portion is four times that of the condensing portion.

15. A d.c. electromagnetic machine comprising a stator, a stator housing, bearings in said housing, a rotor shaft rotatably mounted in said bearings, a rotor secured to said shaft, a heat pipe extending axially along said shaft and forming an evaporating portion within the axial confines of the rotor and a condensing portion outwardly of the axial confines of the stator housing, said rotor having a commutator located adjacent the condensing portion of said heat pipe, the shaft including means defining a pocket extending into the shaft coaxially with the axis of the shaft adjacent the condensing portion of the heat pipe, and further means defining an aperture in said shaft connecting the evaporating portion of the heat pipe to atmosphere, the aperture being sealed by a plug made of a material which fuses in the event of excessive temperatures arising in the rotor.

16. An electromagnetic machine rotor assembly, comprising a rotor mounted on a rotor shaft having a heat pipe extending axially therealong, the heat pipe forming an evaporating portion within the axial confines of the rotor and a condensing portion outwardly of the axial extent of the rotor, the internal surface of said condensing portion being tapered and being of smaller radial dimension remote from the evaporating portion than adjacent the evaporating portion, and said internal surface incorporating upstanding formations of sufficient radial dimension to stand clear of the annular complement of working fluid present in the condensing portion of the heat pipe.

17. An electromagnetic machine rotor assembly, comprising a rotor mounted on a rotor shaft having a heat pipe extending axially therealong, the heat pipe forming an evaporating portion within the axial confines of the rotor and a condensing portion outwardly of the axial extent of the rotor, and said heat pipe including a portion defining an aperture connecting the evaporating portion of the pipe to atmosphere, and also includes a plug of fusible material located in said aperture.

* * * * *